United States Patent [19]

Yokogawa et al.

[11] 3,808,062

[45] Apr. 30, 1974

[54] LIQUID EXPLOSIVE COMPOSITIONS OF HYDROGEN PEROXIDE AND AN AROMATIC SULFORIC ACID AND PROCESS FOR THE PREPARATION THEREOF

[75] Inventors: Mutsuo Yokogawa; Shiro Mitsui; Yoshiyuki Ikeda, all of Yamaguchi-ken, Japan

[73] Assignee: Nippon Kayaku Kabushiki Kaisha, Tokyo, Japan

[22] Filed: Dec. 8, 1972

[21] Appl. No.: 313,408

[52] U.S. Cl. .................................... 149/40, 149/109
[51] Int. Cl. .................................... C06b 15/00
[58] Field of Search .................................... 149/40, 109

[56] References Cited

UNITED STATES PATENTS

| | | | |
|---|---|---|---|
| 3,465,675 | 9/1969 | Bronstein | 149/40 X |
| 3,047,441 | 7/1962 | Baker | 149/109 |
| 3,687,746 | 8/1972 | Bieber et al. | 149/109 X |
| 3,095,334 | 6/1963 | Scurlock | 149/40 X |
| 3,574,011 | 4/1971 | Knight | 149/40 X |
| 3,645,809 | 2/1972 | Stow | 149/40 X |

*Primary Examiner*—Carl D. Quarforth
*Assistant Examiner*—E. A. Miller
*Attorney, Agent, or Firm*—Russell & Nields

[57] ABSTRACT

The present invention relates to liquid explosives comprising hydrogen peroxide and aromatic sulfonic acid and also liquid or gel explosives containing, in addition to hydrogen peroxide and aromatic sulfonic acid, organic plasticizer, gelling agent, inorganic oxidizer salt, metal powder etc. These explosive compositions have a strong explosive power and they are suitable for various purposes by mixing them instantly at a blasting site.

6 Claims, No Drawings

RECEIVER FOR FACSIMILE SYSTEM

The present invention relates to faximile system and more particularly to an improved faximile system which converts a faximile signal into successive "run-length" binary code signals, transmits the successive run-length binary code signals, and reconverts the run-length binary code signals into the original faximile signal.

A faximile system generally includes a transmitter for converting a photographic image carried on an information medium such as paper into an electric image signal, that is, a faximile signal and for transmitting the faximile signal, and a receiver for receiving the transmitted faximile signal and for reconverting the faximile signal into the original photographic image. Since the faximile signal usually consists of space (white) and mark (black) signals due to the nature of photographic image, it is possible to transmit the faximile signal in the form of successive suitable code signals thereby to narrow the necessary frequency band width of the transmission channel and to save the transmission intervals. Various faximile systems have, therefore, been developed, which transmit the faximile signal in the form of code signals. Since, however, conventional faximile systems of such type necessitates buffer memories of large capacities, those are complicated in construction and much costly.

It is a primary object of the present invention to provide an improved faximile system which is economical.

It is another object of the present invention to provide an improved faximile system including an improved receiver which is capable of correctly decoding transmitted code signals in spite of the fluctuations of the code signals due to the impedance of the transmission line.

These and other objects and the attendant advantages of the invention will become more readily appreciated as the same becomes better understood by reference to the following detailed description when taken in conjunction with the accompanying drawings in which:

FIG. 1 is a diagram showing a waveform of a faximile signal.

FIG. 2 is a diagram showing successive binary code signals representing the faximile signal of FIG. 1.

FIG. 3 is a table showing a coding system employed for the faximile system of the invention.

FIG. 4A is a diagram showing an information medium.

FIG. 4B is a diagram showing waveforms produced by scanning with a light-spot the information medium of FIG. 4A.

FIG. 4C is a diagram showing a waveform of a faximile signal transmitted from a transmitter of the faximile system of the invention.

FIGS. 5, 6*a* and 6*b* are block diagrams of a transmitter of a faximile system of the invention.

FIG. 7A is a diagram showing an information medium to be processed by the transmitter of FIGS. 5 and 6.

FIG. 7B is a diagram showing a waveform of a faximile signal produced by the photo-electric converter of FIG. 5.

FIGS. 7C, 7D and 7E are diagrams showing waveforms of signals appearing in the transmitter of FIGS. 5 and 6.

FIGS. 8A through 8D are diagrams showing waveforms of signals appearing in the transmitter of FIGS. 5 and 6.

FIGS. 9A through 9P are diagrams showing waveforms of signals appearing in the transmitter of FIGS. 5 and 6.

FIG. 10 is a diagram for the explanation of the operation of a coding portion of the transmitter of FIGS. 5 and 6.

FIGS. 11A through 11E are diagrams showing waveforms of signals appearing in the transmitter of FIGS. 5 and 6.

FIGS. 12*a* and 12*b* are schematic block diagrams showing a receiver according to the invention.

FIGS. 13A through 13M, and 14A through 14D are diagrams showing waveforms of signals appearing in the receiver of FIG. 12.

FIG. 15 is a block diagram of a part of the receiver of FIG. 12.

FIGS. 16A through 16L are diagrams showing waveforms of signals appearing in the receiver of FIG. 12.

Referring now to the drawings and more specifically to FIG. 1 thereof, there is illustrated a waveform of a faximile signal of 1H which is, namely produced by once horizontally scanning with a light spot an information medium carrying thereon photographic image in the form of letters or figures. It is, in this instance, assumed that the total width of the 1H faximile signal is equal to 98 unit times and mark and space signals of the faximile signal respectively have such widthes as indicated by numerals on the basis of the particular unit time. It is now to be noted that the width of the mark or space signal is usually called run-length.

In FIG. 2, there is shown successive binary code signals respectively representing the run-length of the mark and space signals in the faximile signal shown in FIG. 1. The binary code signal of FIG. 2 is based on a binary coding system as shown in a table of FIG. 3. As shown in FIG. 2, the total bits of the binary code signals are merely 36 and it is accordingly apparent that the transmission interval can be extremely reduced by transmitting the faximile signal in the form of binary code signals.

The coding system shown in the table of FIG. 3 will be explained hereinbelow.

When a run-length ($n$) of an either mark or space signal is equal to or larger than 3 ($n \geqq 3$), the binary code representing the run-length (n) consists of lower figure binary digits representing $n - 1$ and higher figure digits of one or more 0's the number of which equals to (the number of figure of the binary digits of lower figure − 1). When, for example, n equals to 15 ($n = 15$), the lower figure digits are given by $$n - 1 = 14 \text{ (decimal)} = 1110 \text{ (binary)}.$$

Since the number of figure of the lower digits equals to 4, the higher figure digits are 000. Accordingly, when $n = 15$ the binary code according to the particular system is expressed as 0 0 0 1 1 1 0 (higher) (lower) When $n = 1$ and $n = 2$, the corresponding binary codes are otherwise defined as follows:

$$n = 1 \ldots 10$$

$$n = 2 \ldots 11$$

This coding system is advantageous in that a binary code according to the coding system is shorter in time than that of the corresponding run-length except that $n = 1, 2, 3$, or 5. When, for example $n = 100$, the corresponding binary code is shorter than the run-length by a rate of 13/100 ($\approx$1/7.7). When $n = 500$, the corresponding binary code is shorter than the run-length by a rate of 17/500 (1/29.4).

It is now to be understood that the above-mentioned coding system is effective for reducing the transmission interval for space information between lines, letters or the like.

When such photographic image information carried on an information medium as shown in FIG. 4A is scanned along lines $p_1q_1$, $p_2q_2$, $p_3q_3$ and $p_4q_4$, 4, faximile signals $p_1'q_1'$, $p_2'q_2'$, $p_3'q_3'$, and $p_4'q_4'$ are produced in the transmitter, which faximile signals consist of space signals $S_0$, $S_1$, $S_2$, . . . , and mark signals $M_1$, $M_2$, $M_3$, . . . respectively having run-length indicated by parenthesized numerals. The faximile signals are then converted into successive binary code signals are shown in FIG. 4C, wherein pulses V are vertical synchronizing pulses separating the binary code signals each corresponding to a faximile signal of 1-H.

In FIGS. 5 and 6, there is shown a transmitter of a faximile system according to the invention, which generally comprises a faximile signal generator 10 for producing a faximile signal representing photographic image information, a pulse generator 11 for producing a clock pulse signal, a horizontal synchronizing pulse signal and blanking pulse signal, a carrier wave generator 12 for producing carrier waves, a sampler 13 for sampling the faximile signal from the faximile signal generator 10 with the clock pulse signal, a coder 14 for coding the sampled faximile signal into successive binary code signals, and a modulator 15 for modulating a carrier wave with the binary code signals. The faximile signal generator 10 includes a fibre optics cathode-ray tube 20 having a fibre optics faceplate 21 and a horizontal deflection element 22. A horizontal deflection circuit 23 produces a horizontal deflection signal in accordance with a horizontal synchronizing pulse signal from the pulse generator 11. A feed means 24 such as a pair of rollers feeds an information medium 25 carrying thereon image information to be picked up in close proximity to the fibre optics faceplate 21. The feed means 24 is actuated by a prime mover 26 such as an electric pulse motor which is driven by a driver 27 when the driver 27 is energized by a vertical synchronizing pulse signal generated in the sampler 13. A photo-electric converter 28 is positioned in the vicinity of the fibre optics faceplate 21, the converter 28 converts the light-spot modulated by the image information into an electric signal, that is, a faximile signal.

The sampler 13 includes a first binary counter 30 having a trigger input terminal connected to an output of a first AND gate 31 and a clear input terminal connected to an output of a first OR gate 32. Output terminals of the first binary counter 30 are connected to first group input terminals of a coincident circuit 33. The coincident circuit 33 further has second group input terminals connected to output terminals of a second binary counter 34 which has a trigger input terminal connected to an output of a second AND gate 35, and a clear input terminal connected to an output terminal of a vertical synchronizing pulse signal generator 36. The second binary counter 34 has an overflow output terminal through which an overflow signal is produced when the second binary counter 34 overflows. The overflow output terminal is connected to one input of a second OR gate 37 and an input terminal of the vertical synchronizing pulse signal generator 36. The coincident circuit 33 is adapted to produce a coincident signal on an output terminal thereof connected to a set terminal of a first flip-flop circuit 38 and an input terminal of a mark-space signal controller 39. The first flip-flop circuit 38 has a reset terminal connected to an output of the second OR gate 37 and an output terminal connected to one input of the second AND gate 35. The other input of the second AND gate 35 is connected to a clock pulse terminal of the pulse generator 11. The other input of the second OR gate 37 is connected to an output terminal of the mark-space signal controller 39 which has three other input terminals respectively connected to the faximile signal generator, the clock pulse terminal of the pulse generator 11 and an output terminal of a second flip-flop circuit 40. A reset terminal of the second flip-flop circuit 40 is connected to an output terminal of the vertical synchronizing pulse generator 36. The output terminal of the generator 36 is further connected to an input terminal of the driver 27 and to one input of a third OR gate 41 which has an output connected to a set terminal of a third flip-flop circuit 42. A reset terminal of the third flip-flop circuit 42 is connected to a horizontal synchronizing pulse terminal of the pulse generator 11. An output terminal of the flip-flop circuit 42 is connected to one input of the first AND gate 31 the other input of which is connected to the clock pulse terminal of the pulse generator 11. One input of the first OR gate is connected to the output terminal of the vertical synchronizing pulse generator 36.

The coder 14 includes an 1 bit eliminator 50 having an input terminal connected to the output of the second AND gate 35. An output terminal of the 1 bit eliminator 50 is connected to an input terminal of a binary counter 51 having output terminals connected to input terminals of a bit number identify matrix 52 and a parallel in-series out shift register 53. A clear input terminal of the binary counter 51 is connected to an output terminal of a clear pulse generator 54. Output terminals of the bit number identify matrix are connected to input terminals of a coding matrix 55. The parallel in – series out shift register 53 has a trigger input terminal connected to a write pulse generator 56 and a clear input terminal connected to the output terminal of the clear pulse generator 54. The write pulse generator 56 has input terminals respectively connected to the output terminal of the first flip-flop circuit 38 and to the clock pulse terminal of the pulse generator 11. Output terminals of the shift register 53 are connected to input terminals of the coding matrix 55 which has a coding completion signal terminal connected to one input terminal of the clear pulse generator 54 and to input terminals of the first and second OR gates 32 and 41 of the sampler 13. The coding completion signal terminal of the coding matrix is further connected to a trigger terminal of the second flip-flop circuit 40 of the sampler 13. The other input terminal of the clear pulse generator 54 is connected to the overflow terminal of the binary counter 34 of the sampler 13. The shift register 53 has a clear input terminal connected to the output terminal of the clear pulse generator 54 and a shift pulse input terminal connected to an output terminal of a shift pulse generator 57 which has input terminals connected to the horizontal synchronizing pulse termiconverted completely to nonexplosive ones by adding more than nearly the equivalent quantity of water thereto. Accordingly, any misfired explosive which remains after the explosion or any leaked explosive may be treated easily and completely by pouring water thereon.

Said liquid explosive compositions can be converted to gel form by adding a proper quantity of a suitable water-soluble gelling agent such as polyvinyl alcohol, guar gum, carboxymethyl cellulose or methyl cellulose. Viscosity of the compositions can be controlled suitably.

By the addition of the water-soluble gelling agent, the explosive power of the compositions is inclined to be reduced in some degree. If the gelling agent is incorporated in an excessive quantity, the adhesive property of the product is damaged. The preferred quantity of the gelling agent is less than 10 percent by weight of the total composition. For obtaining an efficient viscosity, incorporation of more than 2 percent by weight of the gelling agent is desirable. Thus, the above compositions can be adhered to the surface of an object to be blown up, taking advantage of their adhesive property, or they can be inserted into horizontal or upward bore holes, taking advantage of their adhesive property as in the case of general gell explosives.

The gel explosives may be prepared by merely mixing the liquid component with the gelling agent in a suitable vessel. If the gel explosive is to be prepared at a blasting site, aqueous hydrogen peroxide solution in one container and a fuel comprising aromatic sulfonic acid or a mixture of aromatic sulfonic acid and organic plasticizer in another container are poured into a wide-mouth bottle containing water-soluble gelling agent directly before the use. Each of the components may be transported in said containers, respectively. Thus, the components can be transported safely without fear of explosion, and the desired explosive can be prepared readily.

Of course, it is possible to control the explosive properties of the compositions by incorporating, in the basic composition of the invention comprising the main oxidizing agent and the main reducing agent, ordinary components used in usual explosives, such as inorganic oxidizer sales, for example, ammonium nitrate, sodium nitrate, barium perchlorate and lithium perchlorate as assistant oxidizers, and reducing metal powders, for example, aluminum powder, magnesium powder, aluminum/magnesium alloy powder as assistant reducing agents. Quantities of these assistant oxidizing agents and assistant reducing agents are desirably 5 – 30 percent by weight and 1 – 10 percent by weight, respectively, based on the total composition. With a smaller quantity, the effect of the incorporation is poor and with a larger quantity, the explosive power is decreased and the explosive becomes impracticable.

Said additives may be mixed with the liquid components of the invention in the same manner as in the case of the water-soluble gelling agent. The inorganic oxidizer salts are mixed previously with the aqueous hydrogen peroxide solution to obtain a solution. The metal powders are mixed previously with the water-soluble gelling agent. Thus, the composition can be prepared readily at a blasting site in the same manner as in said case of using of a water-soluble gelling agent as an additive. If the metal powder is to be incorporated, it is most preferred to use the water-soluble gelling agent together with it in order to facilitate homogeneous dispersion of the metal powder in the explosive composition.

The present invention will be illustrated by way of examples.

In Example 1, proportion of aqueous hydrogen peroxide solution to aromatic sulfonic acid was determined so as to satisfy stoichiometric oxygen balance for exhibiting the maximum explosive power. Of course, as in usual explosives, the proportion may be changed freely to shift the oxygen balance in (+) or (−) direction. In this connection, it is to be noted that, if hydrogen peroxide content is reduced, explosive power of the composition is reduced. For example, in No. 1 in Example 1, hydrogen peroxide content is $77.0 \times 90/100 = 69.3$ (percent by weight) and detonation velocity is 8,300m/sec., while in No. 8, hydrogen peroxide content is lower ($85.0 \times 60/100 = 51.0$ percent by weight) and therefore, detonation velocity is also lower (3,500m/sec.). If hydrogen peroxide content in the whole composition is less than 40 percent by weight, initiation of the composition becomes difficult.

Although only five aromatic sulfonic acids are shown in this example, the other aromatic sulfonic acids such as xylenesulfonic acid and phenolsulfonic acid may be used too.

EXAMPLE 1

| Number | Composition, percent: Aqueous hydrogen peroxide solution 90 | 80 | 70 | 60 | Benzene-sulfonic acid | Toluene-sulfonic acid | Naphthalene-sulfonic acid | Anthraquinone sulfonic acid | Nitro-phenol-sulfonic acid | Properties: Specific gravity | Detonation velocity (m./sec.) | Brisance (m./m.) |
|---|---|---|---|---|---|---|---|---|---|---|---|---|
| 1 | [1] 77.0 | | | | [1] 23.0 | | | | | 1.45 | 8,300 | 22.0 |
| 2 | 82.0 | | | | | 18.0 | | | | 1.40 | 8,000 | 22.3 |
| 3 | 84.0 | | | | | | 16.0 | | | 1.42 | 7,900 | 21.8 |
| 4 | 85.0 | | | | | | | 15.0 | | 1.40 | 8,200 | 22.0 |
| 5 | 76.0 | | | | | | | | 24.0 | 1.44 | 8,300 | 22.4 |
| 6 | | 78.8 | | | 21.2 | | | | | 1.32 | 6,200 | 11.5 |
| 7 | | | 80.8 | | 19.2 | | | | | 1.25 | 5,200 | 9.0 |
| 8 | | | | 85.0 | | 15.0 | | | | 1.20 | 3,500 | 6.3 |
| 9 | 83.5 | | | | | 9.0 | | 7.5 | | 1.42 | 8,000 | 22.0 |
| 10 | 80.0 | | | | | | 8.0 | | 12.0 | 1.43 | 8,100 | 22.0 |

[1] By weight.

Note.—Detonation velosity was determined according toDautriche detonation velocity-determining method of Davis described on page 17 of "Chemistry of Powder and Explosives." Brisance was determined according to said Hess method.

The explosive compositions in this example were prepared simply by weighing aqueous hydrogen peroxide solution and aromatic sulfonic acid in separate vessels, pouring the aromatic sulfonic acid into the vessel of aqueous hydrogen peroxide solution and shaking the mixture lightly to obtain homogeneous mixture directly before the use.

In Example 2, too, proportion of aqueous hydrogen peroxide solution, aromatic sulfonic acid and organic plasticizer was determined so as to satisfy stoichiometric oxygen balance. Said proportion may be altered freely. However, it is to be noted that, if hydrogen peroxide content in the whole composition is less than 40 percent by weight, initiation of the composition becomes difficult as mentioned in Example 1.

Although only four typical aromatic sulfonic acids and only four typical organic plasticizers are shown in this example, other aromatic sulfonic acids such as xylenesulfonic acid and phenolsulfonic acid and other organic plasticizers such as dibutyl phthalate and butylallyl phthalate may be used, too.

In this example, the explosive compositions were prepared by mixing aromatic sulfonic acid with organic plasticizer under heating at 90° C and then dissolving the mixture in aqueous hydrogen peroxide solution weighed and placed previously in another vessel.

In Example 3, too, proportion of aqueous hydrogen peroxide solution, aromatic sulfonic acid, organic plasticizer and water soluble gelling agent was selected so as to satisfy stoichiometric oxygen balance as in Example 1. Said proportion may be altered freely. However, if hydrogen peroxide content is less than 40 percent by weight, initiation of the composition becomes difficult as mentioned in Example 1.

Although only two typical concentrations of aqueous hydrogen peroxide solution, two typical aromatic sulfonic acids and two typical organic plasticizers are shown in this example, other concentrations higher than 60 percent by weight of the aqueous hydrogen peroxide solution, other aromatic sulfonic acids such as benzenesulfonic acid and other organic plasticizers such as tricresyl phosphate may be used, too, described above. In addition to the above three water soluble gelling agents, carboxymethyl cellulose may be used.

PROCESS FOR THE PREPARATION OF EXPLOSIVE IN THIS EXAMPLE

Aqueous hydrogen peroxide solution was mixed with aromatic sulfonic acid or with mixture of aromatic sulfonic acid and organic plasticizer in the same manner as in Example 1 or 2 to obtain liquid composition. Thus resulting composition was added to water soluble gelling agent weighed previously in a wide mouth vessel and the whole was stirred to obtain gel explosive composition.

In Example 4, proportion of aqueous hydrogen peroxide solution, aromatic sulfonic acid, organic plasticizer, water soluble gelling agent, water-soluble inorganic oxidizer salt and metal powder was selected so as to satisfy stoichiometric

EXAMPLE 2

| | Composition, percent | | | | | | | | | | | | Properties | | |
|---|---|---|---|---|---|---|---|---|---|---|---|---|---|---|---|
| | Aqueous hydrogen peroxide solution | | | | Aromatic sulfonic acids | | | | Organic plasticizers | | | | | | |
| Number | 90 | 80 | 70 | 60 | Benzenesulfonic acid | Toluenesulfonic acid | Naphthalenesulfonic acid | Anthraquinonesulfonic acid | Dimethyl phthalate | Dioctyl phthalate | Dibutoxyethyladipate | Tricresyl phosphate | Specific gravity | Detonation velocity (m./sec.) | Brisance (m./m.) |
| 1 | 82.8 | | | | 5.7 | | | | | 11.5 | | | 1.38 | 7,800 | 21.0 |
| 2 | 82.0 | | | | | 9.0 | | | 9.0 | | | | 1.40 | 7,300 | 19.8 |
| 3 | 83.0 | | | | | | 8.0 | | | | 9.0 | | 1.36 | 7,600 | 18.9 |
| 4 | 85.0 | | | | | | | 8.0 | | | | 7.0 | 1.40 | 7,000 | 17.6 |
| 5 | | 80.0 | | | 8.0 | | | | 12.0 | | | | 1.30 | 5,900 | 11.3 |
| 6 | | | 82.9 | | | 10.2 | | | | | | 7.6 | 1.24 | 4,500 | 9.3 |
| 7 | | | | 87.5 | 7.5 | | | | | | 5.5 | | 1.20 | 3,300 | 6.0 |

Note.—Detonation velocity and brisance were determined in the same manner as in Example 1.

EXAMPLE 3

| | Composition, percent | | | | | | | | | Properties | | |
|---|---|---|---|---|---|---|---|---|---|---|---|---|
| | Aqueous hydrogen peroxide solution | | Aromatic sulfonic acid | | Organic plasticizer | | Water-soluble gelling agent | | | | | |
| Number | 90 | 70 | Toluenesulfonic acid | Naphthalenesulfonic acid | Dimethyl phthalate | Dioctyl phthalate | Polyvinyl alcohol | Methyl cellulose | Guar gum | Specific gravity | Detonation velocity (m./sec.) | Brisance (m./m.) |
| 1 | 84.0 | | | 11.0 | | | | 5.0 | | 1.18 | 5,500 | 15.0 |
| 2 | | 83.0 | 7.0 | | | 5.0 | | | 5.0 | 1.10 | 3,900 | 8.2 |
| 3 | 82.0 | | 5.7 | | 6.5 | | 5.0 | | | 1.16 | 5,400 | 14.8 |
| 4 | | 87.0 | | 3.0 | | 4.0 | 3.0 | 4.0 | | 1.12 | 4,000 | 8.0 |

Note.—Detonation velocity and brisance were determined in the same manner as in Example 1.

EXAMPLE 4

| | Composition, percent | | | | | | | | | Properties | | |
|---|---|---|---|---|---|---|---|---|---|---|---|---|
| | | | | | Water-soluble inorganic oxidizer salts | | Metal powders | | | | | |
| Number | Aqueous hydrogen peroxide solution, 90% | Aromatic sulfonic acid, toluenesulfonic acid | Organic plasticizer, dimethyl phthalate | Water-soluble gelling agent, polyvinyl alcohol | Ammonium nitrate | Lithium perchlorate | Aluminum powder | Magnesium powder | Water | Specific gravity | Detonation velocity (m./sec.) | Brisance (m./m.) |
| 1 | 80.0 | 12.0 | | 6.0 | | | 2.0 | | | 1.13 | 5,500 | 13.8 |
| 2 | 62.0 | 8.0 | 8.0 | | | 22.0 | | | | 1.50 | 6,000 | 15.3 |
| 3 | 60.0 | 6.0 | 6.0 | 6.0 | 20.0 | | 1.0 | 1.0 | | 1.19 | 5,400 | 13.0 |
| 4 | 82.0 | 18.0 | | | | | | | 20.0 | 1.25 | 5,100 | 10.7 |
| 5 | 80.0 | 12.0 | | 6.0 | | | 2.0 | | 20.0 | 1.09 | 3,900 | 7.8 |

Note.—Detonation velocity and brisance were determined in the same manner as in Example 1.

oxygen balance as in Example 1. Said proportion may be altered freely. However, if hydrogen peroxide content in the whole composition is less than 40 percent by weight, initiation of the composition becomes difficult, as mentioned in Example 1.

In Nos. 4 and 5, 20 percent, based on the gross amount, of water was added to the oxygen-balanced composition comprising aqueous hydrogen peroxide solution and fuel to reduce the explosive power to a desired value. Thus, a composition prepared by using aqueous hydrogen peroxide solution of high concentration may be reduced in its power to a desired value by the addition of water.

Although only some typical concentrations of aqueous hydrogen peroxide solution, aromatic sulfonic acids, organic plasticizers and water soluble gelling agents are shown in this example, other varieties of them may be used, of course, as described in Examples 1, 2 and 3. As water-soluble inorganic oxidizer salt, there may be used also sodium nitrate, barium perchlorate, etc. As metal powder, aluminum-magnesium alloy powder may be used.

PROCESS FOR THE PREPARATION OF EXPLOSIVE IN THIS EXAMPLE

Compositions Nos. 1, 2 and 3 were obtained by charging aqueous hydrogen peroxide solution or a mixture of aqueous hydrogen peroxide solution and water-soluble inorganic oxidizer salt in one vessel, and dissolving aromatic sulfonic acid or a mixture of aromatic sulfonic acid and organic plasticizer in above solution directly before the use to obtain liquid composition.

Liquid explosive composition No. 2 was thus obtained. The compositions Nos. 1 and 3 were obtained by adding said liquid explosive composition to a mixture of water soluble gelling agent and a metal powder weighed and placed in a wide mouthed-vessel previously and then stirring the whole mixture to obtain gel explosive composition. Compositions Nos. 4 and 5 were obtained by previously preparing an explosive composition comprising mixture of aqueous hydrogen peroxide solution and fuel in the same manner as in Examples 1, 2 and 3 or the above Nos. 1, 2 and 3 and then adding a suitable quantity of water thereto to obtain explosive of low explosive power.

50 Grams of product No. 3 in Example 1 packed in a polyethylene film bag were used as a booster of slurry explosive. Detonation velocity of the slurry explosive as compared with that of using conventional pentolite as a booster is shown in the following table. The explosvie charged in a steel pipe of 50m/m inside diameter and set off to determine its detonation velocity.

| Kind of Booster | Detonation Velocity |
|---|---|
| Product No. 3 in Example 1 (50g) | 4,870 m/sec. |
| Pentolite (50g) | 4,790 m/sec. |

Thus, the explosive compositions of the invention can be used as booster which can be prepared readily in a field of blasting.

What is claimed is:

1. An explosive composition comprising a mixture of an aqueous hydrogen peroxide solution of a concentration higher than 60 percent by weight, the hydrogen peroxide being more than 40 percent by weight of the explosive composition, and an aromatic sulfonic acid.

2. An explosive composition comprising a mixture of an aqueous hydrogen peroxide solution of a concentration higher than 60 percent by weight, the hydrogen peroxide being more than 40 percent by weight of the explosive composition, an aromatic sulfonic acid, and one or more materials selected from the group consisting of organic plasticizers, water-soluble gelling agents, inorganic oxidizer salts and metal powders.

3. Explosive composition as set forth in claim 1 comprising a mixture of an aqueous hydrogen peroxide solution of a concentration higher than 60 percent by weight, the hydrogen peroxide being 40 – 82 percent by weight of the explosive composition, and an aromatic sulfonic acid being 3 – 30 percent by weight of said composition.

4. Explosive composition as set forth in claim 2 comprising a mixture of an aqueous hydrogen peroxide solution of a concentration higher than 60 percent by weight, the hydrogen peroxide being 40 – 82 percent by weight of the explosive composition, an aromatic sulfonic acid being 3 – 30 percent by weight of said composition, and one or more materials selected from the group consisting of organic plasticizer of the weight ratio 1 : 0.1 – 1 : 3 versus said aromatic sulfonic acid, water soluble gelling agent being 2 – 10 percent by weight of said composition, inorganic oxidizer salt being 5 – 30 percent by weight of said composition and metal powder being 1 – 10 percent weight of said composition.

5. Process for preparing an explosive which comprises heating an organic plasticizer preliminarily to the temperature range 70° – 100° C and mixing an aromatic sulfonic acid therewith and then mixing the thus obtained mixture with aqueous hydrogen peroxide solution.

6. Process for preparing an explosive which comprises heating an organic plasticizer preliminarily to the temperature range 70°– 100° C and mixing an aromatic sulfonic acid therewith, then mixing the thus obtained mixture with aqueous hydrogen peroxide solution and with one or more materials selected from the group consisting of water-soluble gelling agent, and inorganic oxidizer salt and metal powder.

* * * * *

UNITED STATES PATENT OFFICE
CERTIFICATE OF CORRECTION

Patent No. 3,808,062 Dated April 30, 1974

Inventor(s) Mutsoo Yokogawa et al.

It is certified that error appears in the above-identified patent and that said Letters Patent are hereby corrected as shown below:

Cancel the original columns 1 through 4 and ıbstitute the corrected columns as shown on the attached sheet.

Signed and sealed this 10th day of September 1974.

SEAL)
.ttest:

lcCOY M. GIBSON, JR.
ıttesting Officer

C. MARSHALL DANN
Commissioner of Patents